(12) United States Patent
Wilensky et al.

(10) Patent No.: US 8,050,498 B2
(45) Date of Patent: Nov. 1, 2011

(54) LIVE COHERENT IMAGE SELECTION TO DIFFERENTIATE FOREGROUND AND BACKGROUND PIXELS

(75) Inventors: Gregg D. Wilensky, San Francisco, CA (US); Scott D. Cohen, Sunnyvale, CA (US); Jen-Chan Chien, Saratoga, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1154 days.

(21) Appl. No.: 11/517,189

(22) Filed: Sep. 6, 2006

(65) Prior Publication Data

US 2008/0019587 A1    Jan. 24, 2008

Related U.S. Application Data

(60) Provisional application No. 60/820,087, filed on Jul. 21, 2006.

(51) Int. Cl.
*G06K 9/34* (2006.01)
*G06K 9/00* (2006.01)
(52) U.S. Cl. ........ 382/173; 382/159; 382/224; 382/282; 345/642
(58) Field of Classification Search .................. None
See application file for complete search history.

(56) References Cited

U.S. PATENT DOCUMENTS

| | | | |
|---|---|---|---|
| 5,832,528 A * | 11/1998 | Kwatinetz et al. | 715/272 |
| 5,951,713 A | 9/1999 | Liguori | |
| 5,982,939 A | 11/1999 | Van Hook | |
| 6,078,688 A * | 6/2000 | Cox et al. | 382/173 |
| 6,337,925 B1 | 1/2002 | Cohen et al. | |
| 6,404,936 B1 | 6/2002 | Katayama et al. | |
| 6,473,523 B1 * | 10/2002 | Newman et al. | 382/176 |
| 6,744,923 B1 * | 6/2004 | Zabih et al. | 382/226 |
| 6,876,361 B2 | 4/2005 | Venkataraman | |
| 6,894,704 B1 | 5/2005 | Bourdev et al. | |
| 7,444,019 B2 * | 10/2008 | Boykov et al. | 382/173 |
| 7,536,050 B2 * | 5/2009 | Boykov et al. | 382/173 |
| 2002/0048401 A1 * | 4/2002 | Boykov et al. | 382/173 |
| 2004/0008886 A1 | 1/2004 | Boykov | |
| 2004/0100477 A1 | 5/2004 | Morita et al. | |
| 2005/0271273 A1 * | 12/2005 | Blake et al. | 382/173 |
| 2006/0029275 A1 * | 2/2006 | Li et al. | 382/173 |
| 2006/0055709 A1 | 3/2006 | Robinson et al. | |
| 2006/0159342 A1 | 7/2006 | Sun et al. | |

OTHER PUBLICATIONS

Li et al. (Aug. 2004) "Lazy snapping." ACM Trans. on Graphics, Proc. ACM SIGGRAPH 2004, vol. 23 No. 3, pp. 303-308.*
Veksler, O. (Aug. 1999) "Efficient graph-based energy minimization methods in computer vision." Ph.D. Thesis, Cornell University.*

(Continued)

*Primary Examiner* — Bhavesh Mehta
*Assistant Examiner* — Barry Drennan
(74) *Attorney, Agent, or Firm* — Fish & Richardson P.C.

(57) ABSTRACT

Methods, systems, and apparatus, including computer program products, featuring receiving user input defining a sample of pixels from an image, the image being defined by a raster of pixels. While receiving the user input, the following actions are performed one or more times: pixels are coherently classified in the raster of pixels as being foreground or background based on the sample of pixels; and a rendering of the image is updated on a display to depict classified foreground pixels and background pixels as the sample is being defined.

29 Claims, 6 Drawing Sheets
(1 of 6 Drawing Sheet(s) Filed in Color)

OTHER PUBLICATIONS

Morse, Bryan S., et al., "Image Magnification Using Level-Set Reconstruction." Department of Computer Science, Brigham Young University 3361 TMCB, Provo, UT 84602, 8 pages, Dec. 2001.

Saad, Yousef, "Iterative Methods for Sparse Linear Systems," PWS Publishing Company, a division of International Thomson Publishing, Inc. (1996).

Sethian, J. A., "Level Set Methods and Fast Marching Methods." Cambridge University Press, 1999, p. 73-74.

Wilensky, G. et al., "Improving Image Masks", Pending U.S. Appl. No. 11/607,206, filed Dec. 1, 2006.

International Search Report for PCT Application No. PCT/US07/78807, Apr. 2008.

Boykov, Y. et al., "Interactive Organ Segmentation Using Graph Cuts," Medical Image Computing and Computer-Assisted Intervention, MIC CAI 2000 Lecture Notes in Computer Science; LNCS, Springer-Verlag, BE, vol. 1935, Jan. 1, 2004, pp. 276-286.

Tan, K. et al., "A representation of image structure and its application to object selection using freehand sketches," Proceedings 2001 IEEE Conference on Computer Vision and Pattern Recognition. CVPR 2001. Dec. 8-14, 2001; vol. 2, Dec. 8, 2001, pp. 677-683.

Tan, K. et al., "Selecting objects with freehand sketches," Proceedings of the Eight IEEE International Conference on Computer Vision (ICCV), Vancouver, British Columbia, CA, Jul. 7-14, 2001; vol. 1, Jul. 7, 2001, pp. 337-444.

International Search Report for PCT Application No. PCT/US2007/074022 mailed Jun. 27, 2008.

Boykov, Y. et al., "Iterative Graph Cuts for Optimal Boundary & Region Segmentation of Objects in N-D Images", *Proceedings of "International Conference on Computer Vision"*, vol. I, pp. 105-112, Vancouver, Canada (Jul. 2001).

Collins, T., "Graph Cut Matching in Computer Vision", 9 pages [online], Feb. 2004. Retrieved from the Internet:<URL: http://homepages.inf.ed.ac.uk/rbf/CVonline/LOCAL__COPIES/AV0405/COLLINS/TobyCollinsAVAssign2.pdf> on Oct. 26, 2006.

Geman, S. et al., "Stochastic Relaxation, Gibbs Distributions, and the Bayesian Restoration of Images", *IEEE Transactions on Pattern Analysis and Machine Intelligence*, vol. PAMI-6, No. 6, pp. 721-741 (Nov. 1984).

Kohli, P. et al., "Efficiently Solving Dynamic Markov Random Fields using Graph Cuts", , *Proceedings of the Tenth IEEE International Conference on Computer Vision*, 8 pages [online], 2005. Retrieved from the Internet: <URL: http://cms.brookes.ac.uk/staff/PushmeetKohli/papers/pushmeet-dynamic.pdf> on Oct. 26, 2006.

Levin, A. et al., "A Closed Form Solution to Natural Image Matting", *IEEE Conf. on Computer Vision and Pattern Recognition (CVPR)*, New York, 8 pages [online], Jun. 2006. Retrieved from the Internet: <URL: http://www.cs.huji.ac.il/~alevin/papers/Matting-Levin-Lischinski-Weiss-CVPR06.pdf> on Oct. 26, 2006.

Levin, A. et al., "Colorization using Optimization", *SIGGRAPH, ACM Transactions on Graphics*, 6 pages [online], Aug. 2004. Retrieved from the Internet: <URL: http://www.cs.huji.ac.il/~alevin/papers/colorization-siggraph04.pdf> on Oct. 26, 2006.

Lombaert, H. et al., "A Multilevel Banded Graph Cuts Method for Fast Image Segmentation", *Proceedings of the Tenth IEEE International Conference on Computer Vision (ICCCV'05)*, vol. 1, pp. 259-265 (2005).

Mortensen, E., "Simultaneous multi-frame subpixel boundary definition using toboggan-based intelligent scissors for image and movie editing—A dissertation submitted to the faculty of Brigham Young University for the degree of Doctor of Philosophy", Department of Computer Science, Brigham Young University, pp. 105-153 (Sep. 2000).

Mortensen, E. et al., "Interactive Segmentation with Intelligent Scissors", *Graphical Models and Image Processing*, vol. 60, pp. 349-384 (1998).

Reese, L., "Intelligent Paint: Region-Based Interactive Image Segmentation—A thesis submitted to the faculty of Brigham Young University for the degree of Master of Science", Department of Computer Science, Brigham Young University, 157 pages. (Aug. 1999).

Rother, C. et al., "GrabCut—Interactive Foreground Extraction using Iterated Graph Cuts", ACM Transactions on Graphics (SIGGRAPH'04), Microsoft Research Cambridge, UK, 6 pages [online], 2004. Retrieved from the Internet: <URL: http://research.microsoft.com/vision/cambridge/papers/siggraph04.pdf> on Oct. 26, 2006.

Wang, J. et al., "An Iterative Optimization Approach for Unified Image Segmentation and Matting", *Proceedings of the Tenth IEEE International Conference on Computer Vision (ICCCV'05)*, 8 pages (2005).

Wilensky, G. et al., "Image Mask Generation", Pending U.S. Appl. No. 11/524,219, filed Sep. 19, 2006.

Xiao, J. et al., "Motion Layer Extraction in the Presence of Occlusion using graph Cut", *Oral Presentation at the IEEE Conference on Computer Vision and Pattern Recognition, CVPR 2004*, 8 pages (2004).

Office Action for corresponding EP Application No. 07813184.4 mailed Nov. 29, 2010.

Olga Veksler, "Efficient Graph-Base Energy Minimization Methods in Computer Vision", A Dissertation to the Faculty of the Graduate School of Cornell University, Aug. 1, 1999, XP007915680.

David Mumford et al., "Optimal Approximations by Piecewise Smooth Functions and Associated Variational Problems" Communications on Pure and Applied Mathematics, vol. XLII, pp. 577-685, 1989.

\* cited by examiner

LIVE COHERENT IMAGE SELECTION TO DIFFERENTIATE FOREGROUND AND BACKGROUND PIXELS

CROSS-REFERENCE TO RELATED APPLICATIONS

This application claims priority to U.S. provisional application No. 60/820,087, Live Coherent Image Selection, filed on Jul. 21, 2006; the disclosure of the prior application is considered part of (and is incorporated by reference in) the disclosure of this application.

BACKGROUND

This specification relates to selecting parts of images.

Typical pixel classification techniques allow users to provide input (e.g., through the use of a mouse) that paints or selects some of the pixels from an object in an image that they desire to select. The classification techniques can then classify all other pixels in the image based on the received user input, ideally selecting all pixels from the desired object.

Graph cut techniques, in particular, are pixel classification techniques that lend spatial coherence to the pixel classification, which can be achieved by minimizing an objective cost function with two types of terms: regional costs and boundary costs. Regional costs reflect the cost of labeling a particular pixel as foreground or background. Boundary costs reflect the cost of labeling a pair of neighboring pixels as both foreground, both background, or one each foreground and background. The boundary cost of labeling a pair of pixels with different classifications is high when the two pixels have similar color, since it is likely that two pixels with the similar color should either both be in the selection or both not. Regional costs can be determined by comparing the color of a given pixel to a model of the colors expected in the foreground and the background. Generally, this model is derived from the selected pixels provided by the user. The classification of pixels can be determined by finding a labeling of pixels that minimizes the cost function constrained by the user-selected pixels within the image. There are many techniques that can be used to find a pixel classification by minimizing a cost function. One effective approach achieves this by mapping the pixel classification problem onto a graph and solving a minimum graph cut problem or its equivalent maximum graph flow problem.

Graph cut techniques typically provide a contiguous selection of one or more discrete objects depicted within the image without selecting undesirable or disconnected areas outside the one or more desired objects. However, these techniques typically require extensive computation, making them unresponsive to live user input.

Live classification techniques classify the pixels in an image so that a presentation of the classification can be presented to users as they provide input (e.g., paint the desired object in the image). However, live classification techniques can suffer from poor, incoherent classification, which is typically characterized by partial, rather than complete, object selection (e.g., small areas of misclassification, or 'holes' in the resultant classification). Moreover, live classification can exhibit erratic or unstable behavior as input is received that users find difficult to predict (e.g., classification leaks through relatively small gaps of the boundary of an object depicted in the image). Unintended and undesirable selections require the user to make time-consuming corrections. Furthermore, live classification techniques have previously only been demonstrated on small images because of the slowness of the algorithms employed.

SUMMARY

In general, in one aspect, embodiments feature receiving user input defining a sample of pixels from an image. The image is defined by a raster of pixels. While receiving the user input, the following actions are performed one or more times: 1) pixels are classified coherently in the raster of pixels as foreground or background based on the sample of pixels; and 2) updating a rendering of the image on a display to depict classified foreground pixels and background pixels as the sample is being defined. Other embodiments of this aspect include corresponding systems, apparatus, and computer program products.

These and other embodiments can optionally include one or more of the following features. Coherently classifying can include coherently classifying pixels of a lower resolution version of the image to generate a classification of the lower resolution version of the image. Coherently classifying can include determining a border area of the image based on the classification of the lower resolution version of the image and coherently classifying the border area of the image at a full resolution. Coherently classifying can include minimizing an objective cost function that includes regional costs and boundary costs. Minimizing the objective cost function can include incrementally solving one or more graph cut problems. A previous classification of pixels can be updated based on the coherent classification of pixels. Coherently classifying can include using piecewise constant regional costs.

The piecewise constant regional costs can be one of a cost associated with a foreground classification, a cost associated with a background classification, or a cost associated with a bias. Coherently classifying can include segmenting the image into a plurality of segments, where each segment in the plurality of segments contains a contiguous plurality of pixels. Each segment in the plurality of segments can be coherently classified as foreground or background based on the sample of pixels. Segmenting the image into a plurality of segments can include using a watershed or seed fill segmentation. The sample of pixels can represent only foreground pixels or only background pixels. The coherent classification can be based on the sample of pixels currently being received and any other samples of pixels previously received. Coherently classified foreground pixels can represent one or more regions of the image that respect object boundaries in the image and do not have areas of misclassification. The user input can be received as the user draws a stroke across the image. Rendering the image on a display to depict classified foreground pixels and background pixels can include highlighting either the foreground or background pixels, obfuscating either the foreground or background pixels, applying a filter to either the foreground or background pixels, rendering an image mask depicting foreground or background pixels, or rendering border of areas of either the foreground or background pixels. The image can be in one of the following color spaces: RGB, CMYK, CIELAB, CIE XYZ, CIE LUV, YCC, YIQ, HSB, HSL or Grayscale.

In general, in another aspect, embodiments feature receiving an identification of a sample of pixels from an image having a plurality of pixels. Pixels in the plurality pixels can be coherently classified as foreground or background based on the sample of pixels, including incrementally solving one or more graph cut problems and coherently classifying a border area of the full resolution image where the border area is determined from a classification of a lower resolution version of the image. Other embodiments of this aspect include corresponding systems, apparatus, and computer program products.

These and other embodiments can optionally include one or more of the following features. The sample of pixels can represent only foreground pixels or only background pixels. Coherently classifying can include minimizing an objective cost function that includes regional costs and boundary costs. Coherently classifying can include using a constant regional cost function. Pixels in the plurality of pixels can be coherently classified while receiving the identification of the sample of pixels and a rendering of the image on a display can be updated to depict the foreground pixels and the background pixels during the receiving.

In general, in another aspect, embodiments feature receiving an identification of a sample of pixels from an image having a plurality of pixels. Pixels in the plurality of pixels are coherently classified as being foreground or background based on the sample of pixels and using piecewise constant regional costs. Other embodiments of this aspect include corresponding systems, apparatus, and computer program products.

These and other embodiments can optionally include one or more of the following features. Coherently classifying can include incrementally solving one or more graph cut problems. Coherently classifying includes coherently classifying a border area of the image at a full image resolution where the border area is determined from the classification of a lower resolution version of the image. The sample of pixels can represent only foreground pixels or only background pixels. Coherently classifying can include minimizing an objective cost function that includes regional costs and boundary costs. Pixels in the plurality of pixels can be coherently classified while receiving the identification of the sample of pixels and a rendering of the image on a display can be updated to depict the foreground pixels and the background pixels during the receiving.

Particular embodiments of the subject matter described in this specification can be implemented to realize one or more of the following advantages. A coherent classification can be calculated as quickly as input is received. A visual rendering depicting the classification as input is received provides live feedback to the user. Coherently classifying an image using piecewise constant regional costs provides a predictable and stable pixel classification that spreads out from the user's input. Live feedback and more predictable pixel classification enables the user to focus on reaching their desired high-quality selection quickly and efficiently.

The details of one or more embodiments of the subject matter described in this specification are set forth in the accompanying drawings and the description below. Other features, aspects, and advantages of the subject matter will be apparent from the description and drawings, and from the claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Like reference numbers and designations in the various drawings indicate like elements.

DETAILED DESCRIPTION

Figure 1A:
FIGS. 1A-C illustrate classification of pixels in an image at three time intervals.
Figure 1B:
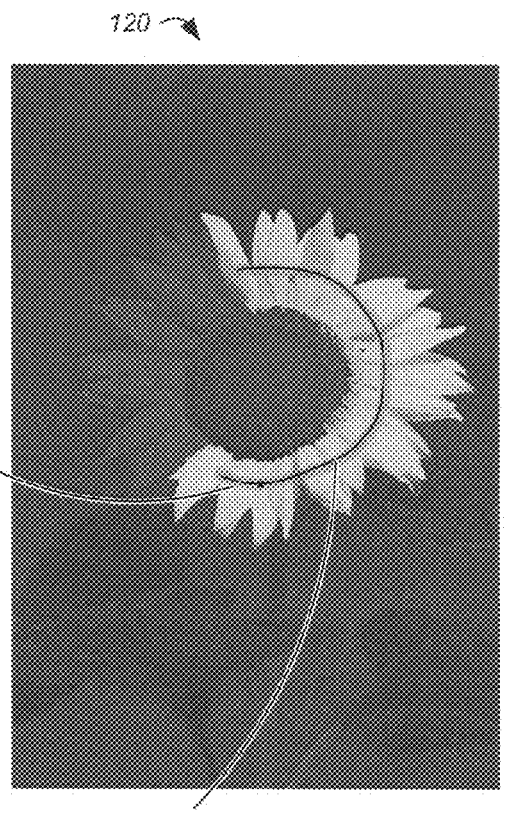
Figure 1C:
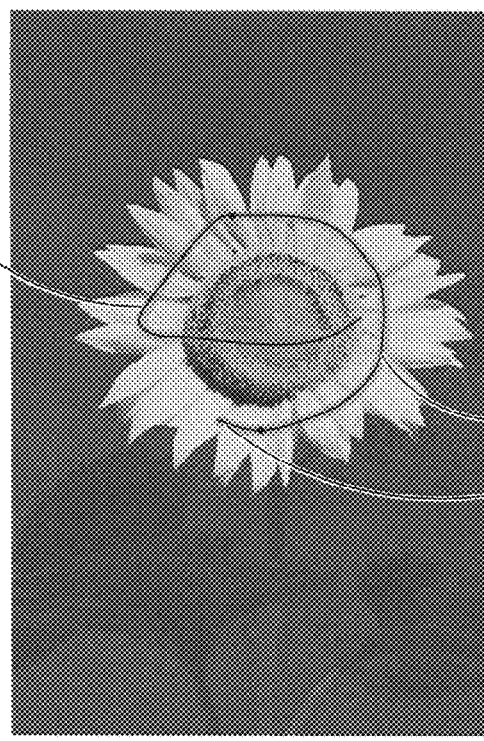

FIGS. 1A-C illustrate pixel classification, where each figure captures the depiction of image selection at one of three successive intervals of time. An image can be represented as a raster of pixels (e.g., a two dimensional array of pixels), where each pixel encodes values (e.g., color, intensity, or both) that describe the image at a particular location.

Typically an image and its constituent pixels are described by and stored in a file having an image format such as the Joint Photographic Expert Group (JPEG) format, Portable Network Graphics (PNG) format, Graphic Interchange Format (GIF) format, Bitmap (BMP) format, Tagged Image File Format (TIFF) format, and others. Color images are typically specified in terms of a particular color space (e.g., RGB, CMYK, CIELAB, CIE XYZ, CIE LUV, YCC, YIQ, HSB, HSL or Grayscale), which determines how the value of each pixel in the image can be interpreted as a color.

Each pixel can be classified as either foreground or background or, in another implementation, can be classified by a continuous value representing the degree of membership in the foreground or the background. The classification of pixels can be used to select one or more areas of the image. The selected pixels are typically subjected to additional operations (e.g., removal, copying, tonal correction or filtering). For example, if an image depicts a person standing in front of a forest of trees, the area in the image depicting the trees behind the person can be selected. The selected area containing the trees can be removed or replaced with another depiction, so that the person appears to be standing in front of something else (e.g., an ocean, a desert or a wedding reception). The selected area can also be subject to application of an image processing filter (e.g., sharpening, blurring, or color balance adjustment of the selected area). Similarly, FIGS. 1A-C depict the selection of the head of a flower, without selecting other parts of the flower (e.g., stem or leaves) or the background (e.g., sky).

In FIGS. 1A-C, the foreground classified pixels are depicted in full color while the background pixels are obfuscated with a blue hue. The pixels that are classified by the user as foreground (e.g., painted with a brush stroke), are indicated for illustrative purposes with a green hue. A black line 125, 135 and 155 shows the path of the input as provided by the user, where each black dot on the line (i.e., between 125 and 135 and between 135 and 155) denotes the extent of input received during each of the previous time intervals. Although the path of the input is separated into three discrete intervals of time, the input is received from the user as a single, live continuous motion. In general, however, the input can also be provided non-continuously and need not be connected (e.g., input can include multiple separate brush strokes).

A user can define a sample of pixels 125 from the image 100 by selecting one or more pixels using an input device. For example, the user can draw a brush stroke 125 over the image 100 using a computer mouse, a touch sensitive screen, track pad, pressure sensitive tablet or another input device. Each pixel covered by the brush stroke can be included in the sample of pixels 125. Alternatively, a sample of pixels 125 can also be provided by a system automatically (e.g., based on identifications made by motion detection, edge detection or machine vision systems). A visual response can be provided, such as highlighting the sample of pixels 125 (e.g., coloring them brightly), to indicate which pixels are in the sample of pixels 125.

The pixels in the sample of pixels 125 are classified as foreground pixels but, in general, pixels can be classified by the user as either foreground or background pixels. Users can denote whether the input is foreground or background by selecting a classification state (e.g., toggling a foreground/background button) or by altering the input (e.g., using left or right mouse button), for example.

The sample of pixels 125 is used to coherently classify other pixels in the image 100. In some implementations, the coherent classification can be achieved by using a graph cut technique. While receiving the sample of pixels 125, the full-color pixels (e.g., the sunflower petals) depicted in the image 100 represent pixels coherently classified as being foreground pixels. All other pixels (e.g., blue pixels) in the image 100 have been classified as background pixels. In some implementations, as in image 100, the classification of pixels is visually rendered by depicting each foreground pixel normally (e.g., according to its encoded color value) and deemphasizing (e.g. with a blue hue) background pixels. In other implementations, the foreground or background pixels can be filtered by an image filter before rendering (e.g., background pixels are blurred). Other depictions of the classification are possible (e.g., depicting an image mask or drawing an animated dotted-line around areas of a particular classification of pixels). Rendering foreground and background classified pixels differently allows a user to distinguish those pixels that have been classified as foreground and those that have not.

At the second interval of time, depicted in image 120, additional pixels 135 are added to the sample of pixels based on user input extending the brush stroke. In response, a new area of pixels is coherently classified as foreground pixels using the samples of pixels (e.g., 135 and 125). The pixels newly classified as foreground pixels ideally select the desired object (e.g., the sunflower petals) based on the sample of pixels (e.g., 125 and 135).

At the third interval of time, the image 140 shows user interaction extending the brush stroke and adding additional pixels 155 to the sample of foreground pixels. In response, a new area of pixels is coherently classified as foreground pixels using the sample of pixels (e.g., 155, 135 and 125). The color of each pixel in the foreground area has similar color as the color of the pixels in the sample of pixels (e.g., 125, 135 and 155). All other pixels remain classified as background.

The intervals of time captured by image 100, 120 and 140 are continuous. Live user input, which is provided by the user, is received during each of the intervals of time. In response, pixels in the image are coherently classified and the image is updated in a live visual rendering. Providing a live visual rendering allows the user to readily perceive how the user's input is affecting classification. Providing live coherent selection in response to live input allows the user to efficiently and quickly achieve the desired classification of pixels.

Figure 2:
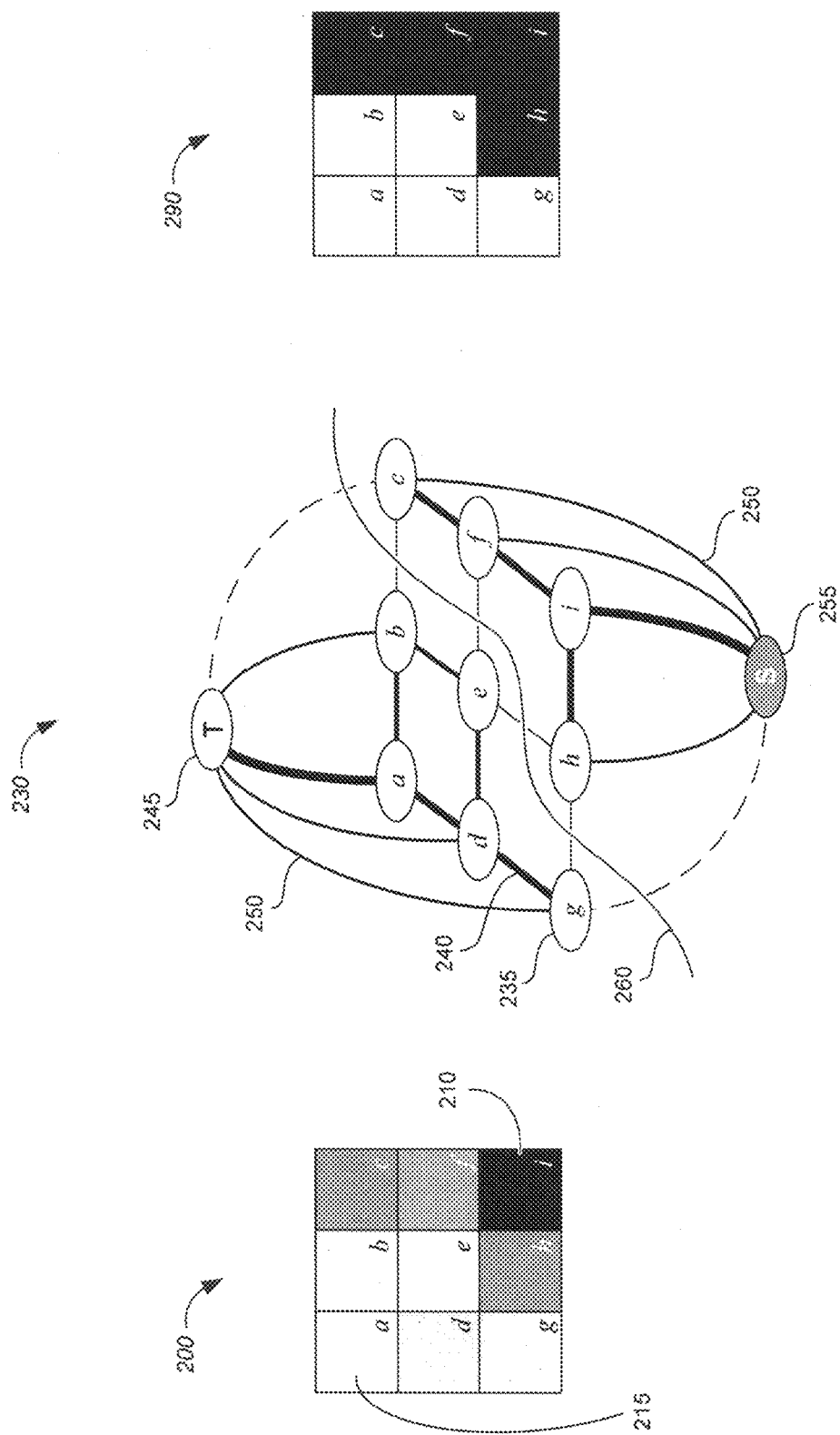
FIG. 2 is an illustration of pixel classification using a minimum graph cut.

FIG. 2 is an illustration of pixel classification using a minimum graph-cut technique. An image 200 can be represented by a graph 230 that can be used to determine a coherent pixel classification 290. The example image 200 contains nine pixels, 'a' through 'i', each representing a different color. A sample of pixels, received from the user, classifies pixel 215 as a foreground pixel. Pixel 'i' is classified as background 210 by another sample of pixels received from the user. In some implementations, if pixel samples received from the user have not included pixels in all classifications (e.g., background and foreground), then the image can be automatically seeded so that the image contains at least one pixel or seed of each classification. A seed is a pixel that is classified in response to user input. In some implementations, a seed can be automatically selected. In general, it is not necessary to seed the image, it is sufficient for the user to specify either a sample of foreground pixels or a sample of background pixels since, in various implementations, the costs of labeling a pixel as foreground and labeling a pixel as background are constants, with the foreground cost slightly larger than the background cost. This "bias" toward the background allows reasonable behavior when the user first begins selecting without providing any background samples.

In some implementations, the image can be automatically seeded by classifying at least one pixel that is not part of the received sample of pixels. For example, if the user provides a background sample of pixels, then the image can be automatically seeded by classifying another pixel as foreground. Alternatively, if the user provides a foreground pixel, then the image can be automatically seeded by classifying another pixel as background. Alternatively, all pixels that are not classified by the user can be automatically classified as the opposite classification. For example, if the user provides a pixel with a foreground classification, all other pixels are automatically classified as background. In some implementations, the pixels classified by automatic seeding can be unclassified if the user subsequently provides a sample of pixels classifying pixels equivalent to the seed classification. For example, if the user classifies a first pixel as foreground, then the image is seeded automatically by classifying a second pixel as background. If the user then classifies a third pixel as background, the automatic classification given to the second pixel can be removed.

In some implementations, an image can be seeded by automatically classifying a pixel based on the pixel's geometric distance from the sample of pixels received from the user. In the image 200, the pixel 210 can be automatically classified as background because it is farthest away from foreground pixel 215. Alternatively, the pixel can be classified based on how different the pixel's value is from one or more pixel values in the sample of pixels (e.g., 215). In the image 200, the foreground pixel 215 is white (e.g., its color values are maximal), the black pixel 210 can be automatically classified as background because its value is, more than any other pixel in the image, most unlike the value of the foreground pixel 215. In other implementations, pixels along the border of an image could be used as background seed pixels.

In other implementations, all of the pixels that were not in the received sample of pixels can be automatically biased. While the pixels in the sample of pixels are known to have a particular classification, the biased pixels are likely to have to have a classification opposite from the received sample. For example, if a foreground sample of pixels contains a single pixel from an image, then all other pixels in the image are biased, effectively making them likely to have a background classification. The likelihood of each pixel's classification is used when mapping the pixel classification problem to a graph.

The image 200 and its pixels ('a'-'i'), of which one is classified as foreground 215 and one is background 210, can be represented by a graph 230. Each pixel in the image 200 is represented by a node (e.g., 235) in the graph 230. Adjacent pixels in the image 200 are represented as adjacent nodes in the graph 230. For example, pixel 'b' and 'd' are adjacent to pixel 'a' in image 200, likewise, nodes 'b' and 'd' are adjacent to node 'a' in graph 230. A node (e.g., 235) is connected with boundary edges (e.g., 240) to others nodes. Boundary edges connect a particular node to the other nodes in the particular node's neighborhood. The neighborhood can be four adjacent pixels, eight adjacent pixels (e.g., including diagonal adjacency) or 24 adjacent pixels (e.g., eight adjacent pixel plus the next 16 nearest pixels). Other neighborhoods are possible.

The weight (shown as line thickness) of each boundary edge is based on the similarity of the pixel values of the connected nodes. Each boundary edge represents the boundary cost of classifying the connected pixels differently (e.g., foreground and background or vice-versa). Two nodes are connected by a high-value edge if their pixel values are similar; they are connected by a low-value edge if their pixel values are dissimilar. For example, the pixels 'a' and 'b' in the image 200 have a similar value, and so the edge between their corresponding nodes 'a' and 'b' in graph 230 also has a high value (i.e., weight). Initially, each node ('a'-'i') also has two regional edges: a foreground regional edge connected to a foreground terminal node 245, and a background regional edge connected to a background terminal node 255. The foreground and background terminal nodes are special nodes that are used to terminate each regional edge. For the sake of clarity, regional edges between the foreground node 245 and nodes 'e', 'f', 'h' and 'i' are not shown; likewise, the regional edges between the background terminal 255 and nodes 'a', 'b', 'd' and 'e' are not shown in the depiction of graph 230.

The weight (shown as line thickness) of each regional edge 250 represents the regional cost of classifying the pixel, represented by the node. The weight of each regional edge 250 connected to the foreground terminal 245 reflects the cost of classifying the connected pixels as foreground. The weight of each regional edge 250 connected to the background terminal 255 reflects the cost of classifying the connected pixels as background.

The weight of each regional edge 250 can be determined based on a model describing the likelihood that the pixel is either background or foreground. In some implementations, the model can be a mixture model (e.g., a Gaussian Mixture Model) that uses the distribution of colors of seed pixels (e.g., foreground seeds and background seeds) to determine the probability that a pixel is in the same classification. For example, the weight of the edge between a pixel and the foreground terminal 245 would be high if the pixel has a high likelihood of being in the foreground. The high weight of the edge reflects the high regional cost of classifying the pixel as background when, according to the model, the pixel is likely foreground. Other models are possible.

Alternatively, the weight of each regional edge can be based on piecewise constant regional costs rather than using a model that changes as seeds are added or removed. The weights of regional edges connected to pixel nodes that have been classified are set using constant values. For example, pixels that have been classified as foreground are connected to the foreground terminal 245 with regional edges having an extremely large weight (e.g., infinity), and connected to the background terminal 255 with regional edges having extremely small weight (e.g., zero). Pixels classified as background are connected to the background terminal 255 with regional edges having an extremely high value and connected to the foreground terminal 245 with regional edges having an extremely small value.

Among pixels that have been biased, but not classified, the weight of regional edges connected to each respective pixel reflects the pixel's bias as either likely foreground or likely background. For example, if several pixels in a foreground sample of pixels are received, all other pixels are biased as likely background pixels. Then, regional edges of each background biased pixel are set to a constant value reflecting the bias. For example, a pixel's background regional edge can be set to zero and the pixel's foreground regional edge can be set to a small but non-zero constant value. Conversely, for pixels that are foreground biased, their foreground regional edges can be set to zero and their background regional edges can be set to a nonzero constant value. The non-zero constant value can be a function of the maximum color value of the allowed value of a pixel. For example, for pixels having an 8-bit color depth and a maximum color value of 255, the non-zero constant value can be derived by the following function: 0.7 ln(255·2).

The use of piecewise regional costs make the resultant classification, and image selection, predictable, locally controlled and stable. The selection is stable because pixels and regions, once selected, tend to stay selected unless the selection is explicitly undone, and selected regions do not automatically become unselected as can occur using other approaches. Similarly, the selection is predictable because selection of unrelated areas of the image does not occur when a color model is used to derive regional costs. When the user classifies foreground pixels, for example, the resulting classification tends to select a region in the image that contains the user-classified pixels.

The graph 230 representing the image 200 is used to coherently classify pixels by solving a minimum graph cut problem, or an equivalent maximum flow problem, that partitions the nodes of the graph into two segments. The solution to the minimum graph cut removes both boundary and regional edges such that the foreground terminal 245 and background terminal 255 become separated in the resultant (i.e., induced) graph. For example, the minimum graph cut 260 severs the boundary edges (e.g., between 'g' and 'h' in graph 230) and region edges (e.g., between node 'g' and the background terminal 255 in graph 230) so that background terminal 255 and foreground terminal 245 are no longer connected. In general, the minimum cut can be determined by calculating a maximum flow through edges and nodes from one terminal node (e.g., 245) to the other (e.g., 255). The minimum graph cut determines a partition that minimizes a cost function whose terms are based on the weight of regional and boundary edges in the initial graph. In general:

$$\text{cost} = \lambda \cdot \sum_i R(\sigma_i) + \sum_{ij} B(i, j) \cdot \delta(\sigma_i, \sigma_j)$$

and $$\delta(\sigma_i, \sigma_j) = \begin{cases} 1 & \text{if } \sigma_i \neq \sigma_j \\ 0 & \text{otherwise} \end{cases}$$

Cost is a function of the cumulative regional cost $R(\sigma_i)$ of classifying each pixel i, where the classification $\sigma_i$ of a particular pixel i can be either 'background' or 'foreground'. Cost is also a function of the cumulative boundary cost $B(i, j)$ for each pixel i and all of its neighboring pixels j, when i and j are classified differently and where neighboring pixels are pixels in the neighborhood of i. The $\lambda$ term is a constant value that determines the relative weight of the boundary costs compared to regional costs.

In some implementations, the cost function can be more specifically specified as:

$$\text{cost} = 2 \cdot \sum_i \left[ \left(\frac{1+\sigma_i}{2}\right)^2 \varepsilon_i^+ + \left(\frac{1-\sigma_i}{2}\right)^2 \varepsilon_i^- \right] + \sum_{ij} \frac{1-\sigma_i \sigma_j}{2} v_{ij}$$

In this function, $\epsilon_i^+$ is the cost associated with the regional edge connecting pixel i to the foreground terminal 245 and $\epsilon_i^-$ is the cost associated with the regional edge connecting pixel i to the background terminal 255. The term $v_{ij}$ is the cost associated with the boundary edge connecting pixel i to its neighbor j. In some implementations, the weights associated with boundary edges depend on the colors $c_i$ and $c_j$ of a pixel i connected by a boundary edge to its neighbor j, respectively. In particular:

$v_{ij} = \eta \cdot e^{-\gamma(c_i - c_j)^2}$ where $\eta$ and $\gamma$ are constant values that can be implementation specific. The color difference $c_i - c_j$ can depend on the color space of the image. For example, when applied to an eight-bit color image, $c_i - c_j$ can be the scalar difference between color values (e.g., from 0 to 255). Other color difference metrics apply to other color spaces (e.g., RGB, CMYK, sRBG, Adobe RGB). When there are multiple color planes, $(c_i - c_j)^2$ is the squared length of the vector of color component differences between pixel i and pixel j. For example, in RGB color space, $(c_i - c_j)^2 = (R_i - R_j)^2 + (G_i - G_j)^2 + (B_i - B_j)^2$. Likewise, in CMYK color space $(c_i - c_j)^2 = (C_i - C_j)^2 + (M_i - M_j)^2 + (Y_i - Y_j)^2 + (K_i - K_j)^2$.

In general, although coherent classification can be achieved by solving a solution to the cost function by using a graph cut, other approaches are possible. For example, a solution can be determined by using the Metropolis algorithm (simulated annealing). Other implementations may treat the cost function as a continuous function with respect to sigma and solve the resulting differential equation.

The solution for the cost function identifies values for $\sigma_i$ (sigma) at each pixel i in the image. In one implementation, the value of sigma can be expressed as a numerical value between 0 and 1, inclusive. For example, a value of zero or near zero indicates that a pixel is background and a value of one or near one indicates that the pixel is foreground. The sigma values associated with each pixel can be used to determine selection mask opacity of each pixel. For example, opacity of a pixel i can be calculated as:

$$\text{opacity} = m \cdot \frac{1 + \sigma_i}{2}$$

The value m is the maximum allowed opacity value and can correspond to the bit depth of the selection mask being determined (e.g., m=255 for an 8-bit selection mask). The opacity can then be used to determine a selection mask that includes pixels having a particular opacity value (e.g., specified as a pre-determined or user-defined threshold).

The coherent pixel classification 290 illustrates the coherent classification according to the graph cut 260 of graph 230. The pixels a, b, d, e and g, shown in white, are classified as foreground, while the pixels c, f, g and i, shown in black, are classified as background. Each pixel is classified according to whether its corresponding node in the graph 230 is attached by a regional edge to the foreground terminal 245 or to the background terminal 255 after the graph cut 260. The nodes that remain connected to the foreground terminal 245 are used to classify foreground pixels. Nodes connected to the background terminal 255 are used to classify background pixels. For example, in graph 230 node 'h' remains connected to the background terminal 255, so pixel 'h' is classified as background.

If a subsequent sample of pixels is received, the graph is altered to reflect the added user classified pixels. For example, if pixel 'c' is classified as foreground in the image 200, the graph 230 can be updated by increasing the weight of the regional edge connecting node 'c' to the foreground terminal 245. A new minimum graph cut can be determined based on the updated graph. The resultant partitioning of the updated graph by the new minimum graph cut is used to re-classify the image pixels.

In some implementations, the new minimum graph cut for the updated graph can be determined incrementally. Incrementally determining the new minimum graph cut uses all or part of the solution used to determine the previous minimum graph cut. In general, the minimum cut can be determined by calculating a maximum flow through edges and nodes from one terminal node (e.g., node 245), the source node, to the other (e.g., node 255), the sink node. When a graph is updated so that one or more edges have increased in value but no edge has decreased in value, then determining the new minimum graph cut can begin, using the previous solution flow and then push additional flow through the added capacity of the edges. If an edge e=(i, j) between two non-terminal nodes i and j has its capacity decreased below the currently flow through e, then the newly formed excess at node i can be sent to the sink node (t). Likewise, the deficit flow at node j can be received from the source node (s) to restore flow feasibility. Adjusting the flows in this way can require increasing the capacities on (s, j) and (j, t) by the same amount, which does not change the optimal cut. Similar capacity increases can be made to the edges (s, i) and (i, t). After making these adjustments the graph cut solution can be re-started. Further information and additional techniques for incrementally updating graph cut solutions can be found in Active Graph Cuts by Juan and Boykov in the IEEE Computer Society Conference on Computer Vision and Pattern Recognition (2006).

As new samples of pixels are received (e.g., with additional brush strokes) the updated classification of pixels is a combination of the previous pixel classification and the new pixel classification determined from the additional samples. When the first sample of foreground pixels is received, the updated classification is simply the new classification, since no previous classification had been determined. When a second sample of foreground pixels is received the resultant classification is a sum of the previous classification and the new classification. In implementations that calculate an opacity value between 0 and 1 for each pixel, this sum can be calculated as:

$o_r = o_p + o_n - (o_p \cdot o_n)$

The value $o_r$ is the resultant opacity for a pixel, the sum of the previous opacity value ($o_p$) and the new opacity value ($o_n$) minus a normalizing value, which assures that the resultant opacity is between 0 and 1.

Similarly, if the second sample of pixels are background pixels, then the resultant classification is the new classification subtracted from the previous classification. In implementations that calculate an opacity value, the result opacity of a pixel is given by:

$o_r = o_p \cdot o_n$

In general, the previous classification need not have been determined by coherently classifying pixels. The previous classification of pixels may have been achieved using a different classification method (e.g., with a magic wand tool).

In some implementations, graphic cut computation can be aborted prematurely before the full solution has been computed. In practice, using a partially computed graph cut usually contains small imperfections but provides a close approximation of the full solution. The computation of the graph cut can be aborted within a particular period of time (e.g., 100 milliseconds) to guarantee responsive feedback to the user.

In some implementations a node in the graph can correspond to several pixels in an area of the image as long as each pixel has relatively uniform color. Each pixel that corresponds to a particular node can be classified according to the particular node. As long as each pixel that corresponds to a single node is very close in color (e.g., their boundary edges have high values) they are likely to all be background or foreground pixels (e.g., the cost of classifying two neighboring pixels is high). Areas of pixels can be determined by a segmentation method. In one implementation, the segmentation can be derived using the watershed algorithm. In another implementation, the segmentation can be derived using the seed fill algorithm (e.g., for each pixel, select all nearby pixels having the same or nearly the same color).

Figure 3:
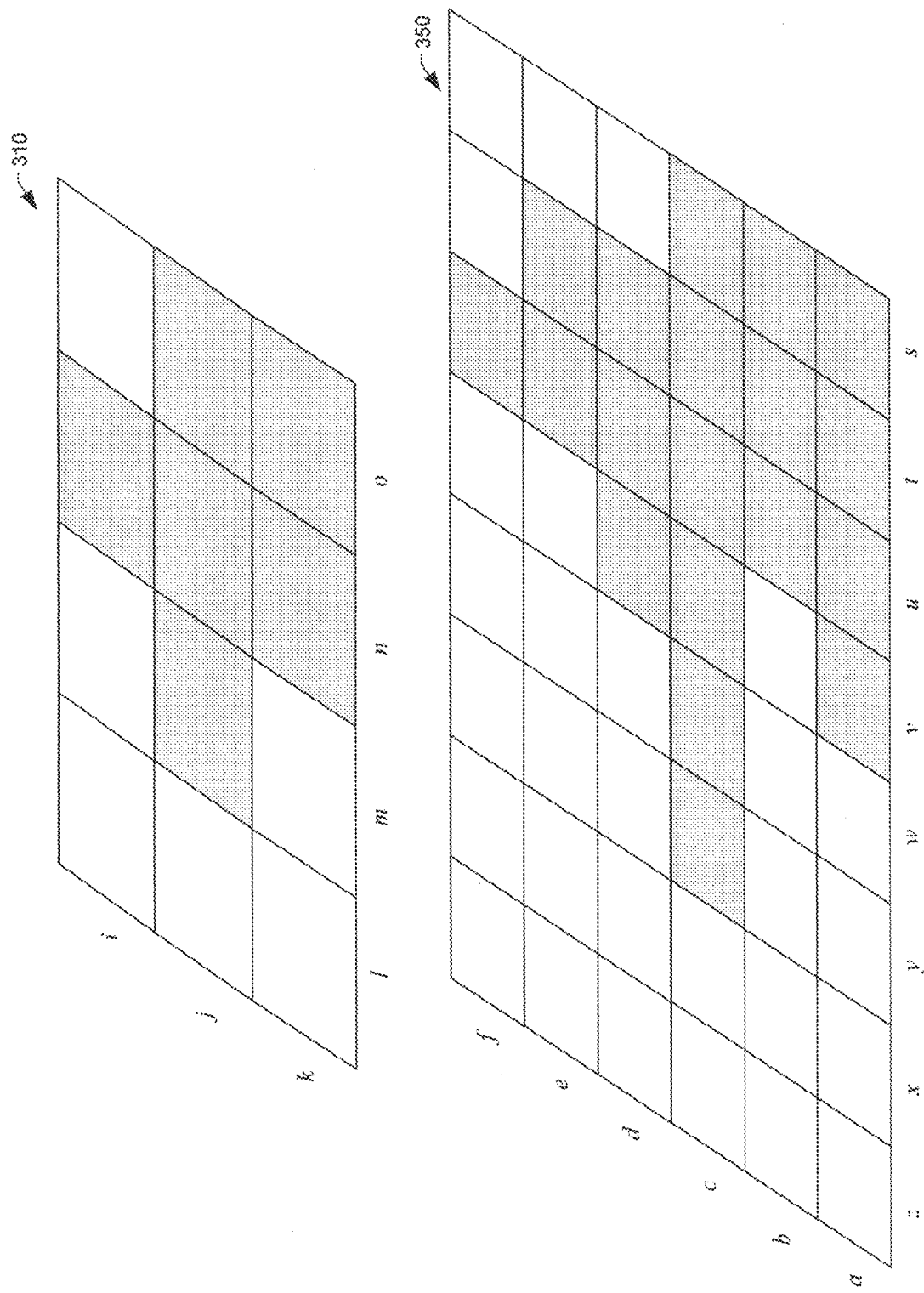
FIG. 3 is an illustration of an image at multiple resolutions.

FIG. 3 is an illustration of an image at multiple resolutions. For example, a full image 350 is eight pixels long (z-s) by six pixels wide (a-f). The resolution of the full image reflects the full resolution of the image of interest to the user. A lower-resolution image 310 is four pixels long (l-o) and three pixels wide (k-i) and contains pixels which are each representative of one or more pixels from the full image 350. In this illustration, each pixel in the lower-resolution image 310 is representative of four pixels in the full image 350. For example, the pixel (o, k) at in the lower-resolution image 310 is representative of the four pixels (a, t), (a, s), (b, t) and (b, s) in the full image 350. In some implementations, the lower-resolution image 310 is automatically generated from the full image by down sampling the full image 350. Scaling the image can be based on pixel sampling (e.g., including every other pixel), linear interpolation, bicubic interpolation or other image scaling techniques.

Both the full image 350 and lower-resolution image 310 can be used to coherently classify pixels in full image 350. In some implementations, the user can interact with a graphical rendering of the full image 356 (e.g., selecting pixels), as described in FIG. 1. The pixels in the sample of pixels received from the user are pixels from the full image 350. The pixels in the sample of pixels are mapped to pixels in the lower-resolution image 310 based on which pixels in the lower-resolution image 310 represent the pixels in the sample of pixels. For example, if pixel (c, u) is in a sample of pixels classified as foreground, then the pixel (n, j) in the lower-resolution image 310 is classified as foreground. Alternatively, the user can interact with the lower-resolution image 310 where the pixels in sample of pixels received from the user are from the lower-resolution image 310.

To coherently classify pixels in the full image 350, the pixels in the lower-resolution image 310 can be coherently classified first. For example, the lower-resolution image 310 is coherently classified into foreground pixels (e.g., gray squares) and background pixels (e.g., white squares), as described above. The coherently classified pixels in the lower-resolution image 310 are used to determine a low-resolution coherent classification of pixels in the full image 350. The pixel classifications in the low-resolution image 310 can be applied to the pixels in the full image 350 using, in reverse, the mapping used to scale down the full image 350. For example, if pixel (m, j) in the lower-resolution image 310 is classified as foreground, then the corresponding pixels (d, y), (d, w), (c, y) and (c, w) in the full image 350 are also classified as foreground. The low-resolution coherent classification can be refined by classifying or reclassifying some of the pixels in the full image 350 at full resolution (i.e., each pixel individually).

Figure 4:
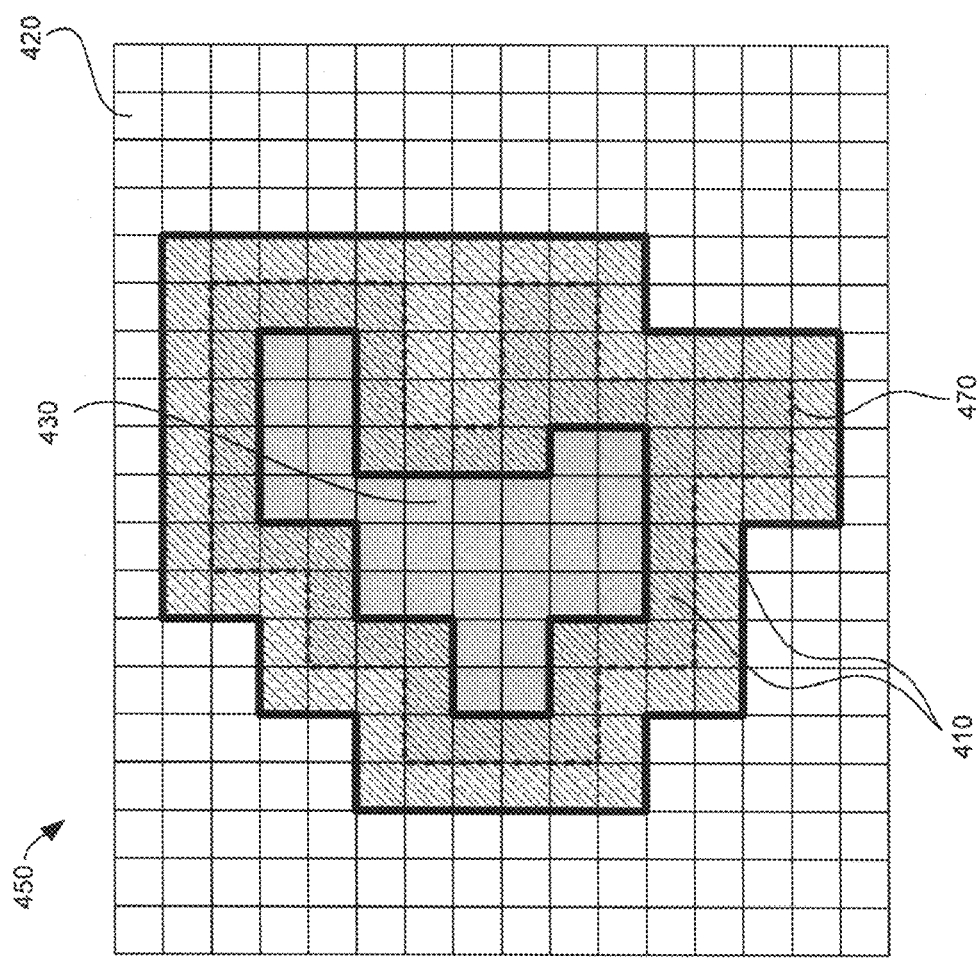
FIG. 4 is an illustration of classifying a border area.

FIG. 4 is an illustration of classifying an identified border area 410 within a full resolution image 450. Pixels in the image 450 have been classified using a coherently classified lower resolution version of the image 450. For example, pixels in the area 430 bounded by border (dashed line) 470 are classified as foreground pixels. The border 470 is where foreground and background classified pixels meet according to the low-resolution coherent classification. The border area 410 can include all pixels that are adjacent to the border 470.

The border area 410 includes all pixels within a certain radius from the border 470. For example, the border area can include all the neighboring pixels of bordering pixels, or can include all pixels that are less than four pixels away from the border. In general, the length of the radius is proportional to the difference in resolution between the lower resolution image and the full resolution image. For example, the length of the radius can be determined by the function $2^{L+1}$ when the full resolution image is $2^L$ larger than the lower resolution image. Other radii are possible.

Optionally, the pixels within the border area 410 can be coherently classified at full resolution. Coherently classifying the full resolution border area 410 coherently classifies the pixels in the border area 410 based on the values of pixels within the border area, rather than on the low-resolution coherent classification. The procedure for setting the costs of pixels in the border region is described above, except that classification of pixels around the border region are frozen. Freezing a pixel implies setting the regional costs of a pixel that is classified as foreground (e.g., according to the lower resolution image) as $\epsilon^+=0, \epsilon^-=\infty$ and setting the regional costs of a pixel classified as background as $\epsilon^+=\infty, \epsilon^-=0$.

Alternatively, a representative high resolution graph can be constructed or amended from the low-resolution graph and incrementally solved beginning from the low-resolution solution. Pixels outside the border area 410 retain their classification according to the low-resolution classification. By coherently classifying the lower-resolution image and then reclassifying the border area 410 in the full image 450, the full image 450 can typically be coherently classified using fewer calculations than coherently classifying the entire full image 450 from scratch. For example, no further calculation beyond the coherent classification of the lower-resolution image is necessary to accurately classify the pixels in the area 420 (outside the border area 410) and the pixels in the area 430 (outside the border area 410).

In some implementations, using multiple resolution image levels need not be limited to only a full resolution image and a lower-resolution image. Many resolution levels, each level having a lower-resolution image than the next, are possible. For example, images at three levels of resolution can be used to coherently classify pixels at each level using the previous level's lower-resolution solution. In some implementations, the number of levels can be determined dynamically based on how many pixels the full image contains.

Figure 5:
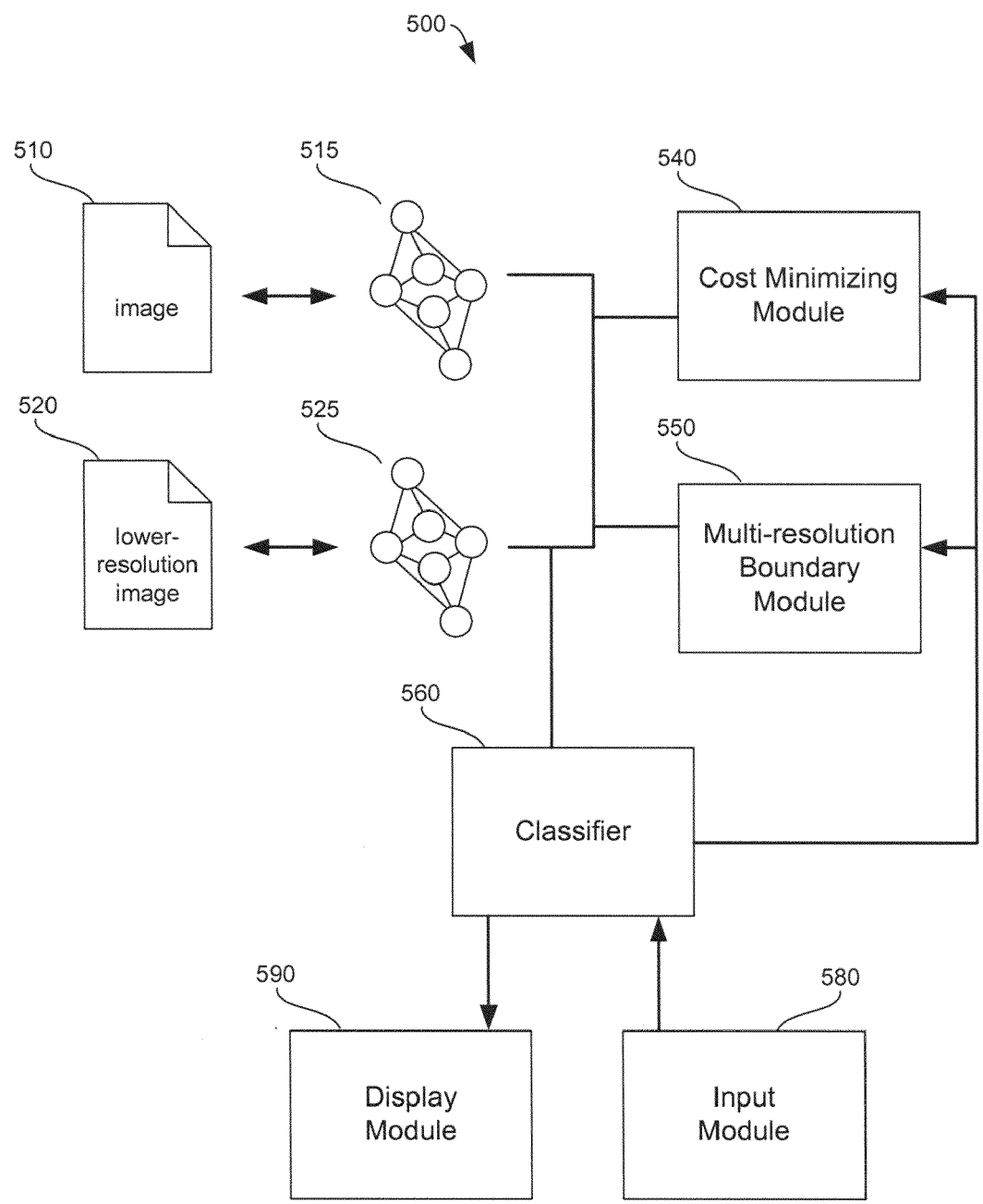
FIG. 5 is a block diagram of an image selection system.

FIG. 5 illustrates a system 500 for coherently classifying pixels in an image. The system 500 generally consists of modules (e.g., module 540) and resources (e.g., image 510). A module is typically a unit of distinct functionality that can provide and receive information to and from other modules. Modules can facilitate communication with input or output devices (e.g., display module 590). Modules can operate on resources. A resource is a collection of information that is operated on by a module.

The system 500 contains an image 510 containing the pixels to be coherently classified. The system can also contain one or more lower-resolution images 520. A cost minimizing module 540 can generate a representative graph 515 for the image 510, and for any lower-resolution graphs (e.g., graph 525) for each of the one or more lower-resolution images (e.g., image 520). The cost minimizing module 540 can calculate a graph cut on the graphs 515 or any lower-resolution graphs 525.

The system 500 includes an input module 580 for receiving pixel samples from the user. The input module 580 can receive input from one or more input devices. The input module 580 can also determine the classification of the pixel sample. For example, the classification can be based on the state of a device such as the state of a keyboard key, whether the left or right mouse button is being used, or the type of pen providing input to the tablet device.

A classifier 560 receives pixel samples from the input module 580. The classifier 560 updates the graph 515 according to the information in the pixel samples, and can also seed the image 510 with alternative pixel classifications. The classifier 560 can also provide information to the display module 590 so that a response indicating that the pixel sample has been received can be provided to the user. The display module 590 can be connected to one or more display devices.

The classifier 560 can also trigger the cost minimizing module 540 to minimize a cost function associated with each image, which can include calculating a graph cut (e.g., in response to receiving the sample of pixels and updating graph 515) for any of the available graphs (e.g., graph 515 and 525). Using the graph cut, the classifier 560 classifies pixels in the image 510 according to the graph cut of the graph 515. In response to classifying pixels, the classifier 560 can provide information to the display module 590 so that a response is provided to indicate the classification of pixels in the image 510 (e.g., obfuscating background pixels or drawing an animated dotted-line around areas of foreground pixels).

The system 500 can also include a multi-resolution boundary module 550 that can apply the lower-resolution classification determined by the lower-resolution image graph (e.g., graph 525) to the full resolution image 510. The boundary module 550 determines a border area in the full resolution image 510 that consists of all pixels in proximity to one or more borders where two different classifications meet.

For example, a brush stroke of a particular sample of pixels is received from a device connected to the input module 580 and causes the classifier 560 to classify the pixels in the particular sample of pixels in the graph 515 and lower-resolution graph 525. The classifier 560 provides information to the display module 590 so that the particular sample of pixels can be visually identified (e.g., highlighted). The classifier 560 can trigger the cost minimizing module 540 to calculate a graph cut on the low resolution image graph 525. The multi-resolution boundary module 550 determines a border area from the lower resolution image 525 and updates the full resolution graph 515. The cost minimizing module 540 can be invoked again to calculate a graph cut of the updated full resolution graph 515. The classifier uses the resultant graph cuts on both the full resolution graph 515 and lower-resolution graph 525 to classify pixels in the full resolution image 510 and supplies information to the display module 590, which provides a visual rendering of the image 510 indicating the classification of each pixel.

In other implementations, however, the lower-resolution classification determined from the lower-resolution graph 525 can be provided in a preliminary visual rendering (e.g., a low-resolution preview of the full-resolution classification) while user input is being received (e.g., during click and drag of the mouse). When user input is no longer being received (e.g., when receiving a mouse-up event), a full-resolution classification, determined using the full-resolution graph 515, can be provided in a visual rendering indicating the high-resolution classification of each pixel in the image 510.

Figure 6:
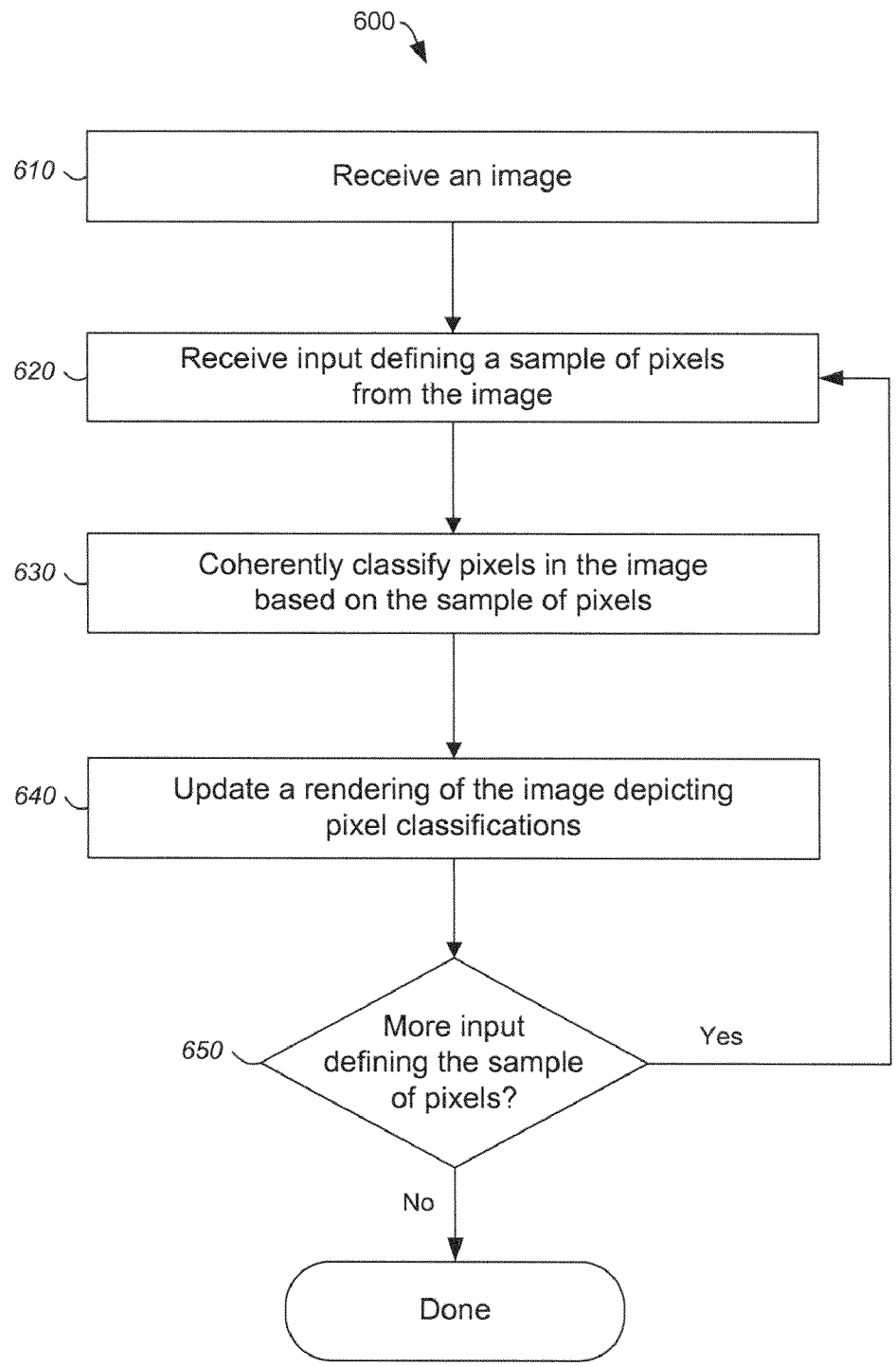
FIG. 6 is a flow diagram of a method for classifying pixels in an image.

FIG. 6 is a flow diagram of a method 600 for classifying pixels in an image. The method 600 operates on a received image (step 610). From the received image, input defining a sample of pixels is received from the user (step 620). The pixels in the received image are coherently classified based on the sample of pixels (step 630). Coherently classifying pixels in the image includes creating a graph representative of the image and the seeds. The rendering of the image can be updated to reflect the classification of pixels (step 640). For example, foreground pixels can be shown as highlighted or selected. In another implementation, background pixels can appear as darkened or covered with a colored overlay. From the updated rendering the user can easily discern what areas of the image contain pixels that are classified as foreground or background.

Pixel classification and updating of the rendering of the images occurs as input is received. If further pixels are received from the user (step 650), that further input is received and processed (return to step 620). When the desired classification has been reached, the classified pixels can, in general, be subject to further operations (e.g., select classified pixels, transform classified areas of the image, create an image mask).

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results.

What is claimed is:

1. A computer-implemented method, comprising:
   receiving user input as an unbroken stroke drawn on an image, the unbroken stroke defining a sample of pixels from an image, the image being defined by a raster of pixels, wherein the unbroken stroke defining the sample of pixels from the image includes a first event defining a beginning of the definition of the sample of pixels and a second event defining an end of the definition of the sample of pixels;
   defining a plurality of piecewise constant regional cost values independent of the sample of pixels, wherein the piecewise constant regional cost values include:
      a foreground cost value associated with a foreground classification;
      a background cost value associated with a background classification; and
      a bias cost value associated with a bias toward the background classification or the foreground classification; and
   while receiving the user input as an unbroken stroke, performing the following actions one or more times after receiving the first event but before receiving the second event:
      classifying pixels in the raster of pixels into one or more coherent regions, with each region classified as being foreground or background based on the sample of pixels and using the plurality of piecewise constant regional cost values, wherein each coherent region includes at least some pixels in the raster of pixels not included in the sample of pixels; and updating a rendering of the image on a display to depict classified foreground pixels and background pixels as the sample is being defined.

2. The method of claim 1, where classifying includes:
classifying pixels of a lower resolution version of the image to generate a classification of the lower resolution version of the image.

3. The method of claim 2, where classifying includes:
determining a coherent border area of the image based on the classification of the lower resolution version of the image; and
classifying the coherent border area of the image at a full resolution.

4. The method of claim 1, where:
classifying includes minimizing an objective cost function that includes regional costs and boundary costs.

5. The method of claim 4, where minimizing the objective cost function includes:
incrementally solving one or more graph cut problems.

6. The method of claim 1, further comprising:
updating a previous classification of pixels based on the coherent classification of pixels.

7. The method of claim 1, where classifying includes:
segmenting the image into a plurality of segments, each segment in the plurality of segments containing a contiguous plurality of pixels; and
classifying segments in the plurality of segments as being foreground or background based on the sample of pixels.

8. The method of claim 7, where segmenting the image into a plurality of segments includes:
using a watershed or seed fill segmentation to segment the image.

9. The method of claim 1, where:
the sample of pixels represents only foreground pixels or only background pixels.

10. The method of claim 1, where:
the coherent classification is based on the sample of pixels currently being received and any other samples of pixels previously received.

11. The method of claim 1, where:
coherently classified foreground pixels represent one or more regions of the image that respect object boundaries in the image and do not have areas of misclassification.

12. The method of claim 1, where the rendering of the image on a display to depict classified foreground pixels and background pixels includes one or more of:
highlighting either the foreground or background pixels;
obfuscating either the foreground or background pixels;
applying a filter to either the foreground or background pixels;
rendering an image mask, the image mask depicting foreground or background pixels; or
rendering a border of areas of either the foreground or background pixels.

13. The method of claim 1, where:
the image is in one of the following color spaces: RGB, CMYK, CIELAB, CIE XYZ, CIE LUV, YCC, YIQ, HSB, HSL or Grayscale.

14. A computer-implemented method, comprising:
receiving an identification of a sample of pixels from an image having a plurality of pixels, wherein the identification of the sample of pixels is received as an unbroken stroke drawn on an image;
defining a plurality of piecewise constant regional cost values independent of the sample of pixels, wherein the piecewise constant regional cost values include:
a foreground cost value associated with a foreground classification;
a background cost value associated with a background classification; and
a bias cost value associated with a bias toward the background classification or the foreground classification; and
classifying pixels in the plurality of pixels into one or more coherent regions, with each region classified as being foreground or background based on the sample of pixels and using the plurality of piecewise constant regional cost values, including incrementally solving one or more graph cut problems and classifying a coherent border area of the image at a full image resolution, the border area being determined from a classification of a lower resolution version of the image, wherein each coherent region includes at least some pixels in the raster of pixels not included in the sample of pixels;
wherein the pixels in the plurality of pixels are classified while receiving the identification of the sample of pixels, receiving the identification of the sample of pixels including receiving a first event corresponding to a beginning of the unbroken stroke and receiving a second event corresponding to an end of the unbroken stroke, and classifying the pixels is performed after receiving the first event but before receiving the second event.

15. The method of claim 14, where:
the sample of pixels represents only foreground pixels or only background pixels.

16. The method of claim 14, where classifying includes:
minimizing an objective cost function that includes regional costs and boundary costs.

17. The method of claim 14, further comprising:
updating a rendering of the image on a display to depict the foreground pixels and the background pixels during the receiving.

18. A computer-implemented method, comprising:
receiving an identification of a sample of pixels from an image having a plurality of pixels, wherein the identification of the sample of pixels is received as an unbroken stroke drawn on an image;
defining a plurality of piecewise constant regional cost values independent of the sample of pixels, wherein the piecewise constant regional cost values include:
a foreground cost value associated with a foreground classification;
a background cost value associated with a background classification; and
a bias cost value associated with a bias toward the background classification or the foreground classification; and
classifying pixels in the plurality of pixels into one or more coherent regions, with each region classified as being foreground or background based on the sample of pixels and using the piecewise constant regional cost values and each coherent region includes at least some pixels in the raster of pixels not included in the sample of pixels;
wherein the pixels in the plurality of pixels are classified while receiving the identification of the sample of pixels, receiving the identification of the sample of pixels includes receiving a first event corresponding to a beginning of the unbroken stroke and a second event corresponding to an end of the unbroken stroke, and classifying the pixels is performed after receiving the first event but before receiving the second event.

19. The method of claim 18, the classifying includes:
incrementally solving one or more graph cut problems.

20. The method of claim 18, the classifying includes:
classifying a coherent border area of the image at a full image resolution, the border area being determined from the classification of a lower resolution version of the image.

21. The method of claim 18, where:
the sample of pixels represents only foreground pixels or only background pixels.

22. The method of claim 18, where classifying includes:
minimizing an objective cost function that includes regional costs and boundary costs.

23. The method of claim 18, further comprising:
updating a rendering of the image on a display to depict foreground pixels and background pixels as the identification of the sample of pixels is being received.

24. A computer program product, encoded on a computer-readable medium, operable to cause data processing apparatus to perform operations comprising:
receiving user input as an unbroken stroke drawn on an image, the unbroken stroke defining a sample of pixels from an image, the image being defined by a raster of pixels, wherein the user input defining the sample of pixels from the image includes a first event corresponding to a beginning of the unbroken stroke and defining a beginning of the definition of the sample of pixels and a second event corresponding to an end of the unbroken stroke and defining an end of the definition of the sample of pixels;
defining a plurality of piecewise constant regional cost values independent of the sample of pixels, wherein the piecewise constant regional cost values include:
a foreground cost value associated with a foreground classification;
a background cost value associated with a background classification; and
a bias cost value associated with a bias toward the background classification or the foreground classification; and
while receiving the user input as an unbroken stroke, performing the following actions one or more times after receiving the first event but before receiving the second event:
classifying pixels in the raster of pixels into one or more coherent regions, with each region classified as being foreground or background based on the sample of pixels and using the plurality of piecewise constant regional cost values, wherein each coherent region includes at least some pixels in the raster of pixels not included in the sample of pixels; and
updating a rendering of the image on a display to depict classified foreground pixels and background pixels as the sample is being defined.

25. A computer program product, encoded on a computer-readable medium, operable to cause data processing apparatus to perform operations comprising:
receiving an identification of a sample of pixels from an image having a plurality of pixels, wherein the identification of the sample of pixels is received as an unbroken stroke drawn on an image;
defining a plurality of piecewise constant regional cost values independent of the sample of pixels, wherein the piecewise constant regional cost values include:
a foreground cost value associated with a foreground classification;
a background cost value associated with a background classification; and
a bias cost value associated with a bias toward the background classification or the foreground classification; and
classifying pixels in the plurality of pixels into one or more coherent regions, with each region classified as being foreground or background based on the sample of pixels and using the plurality of piecewise constant regional cost values, including incrementally solving one or more graph cut problems and classifying a coherent border area of the image at a full image resolution, the border area being determined from a classification of a lower resolution version of the image, wherein each coherent region includes at least some pixels in the raster of pixels not included in the sample of pixels;
wherein the pixels in the plurality of pixels are coherently classified while receiving the identification of the sample of pixels, receiving the identification of the sample of pixels includes receiving a first event corresponding to a beginning of the unbroken stroke and receiving a second event corresponding to an end of the unbroken stroke, and classifying the pixels is performed after receiving the first event but before receiving the second event.

26. A computer program product, encoded on a computer-readable medium, operable to cause data processing apparatus to perform operations comprising:
receiving an identification of a sample of pixels from an image having a plurality of pixels, wherein the identification of the sample of pixels is received as an unbroken stroke drawn on an image;
defining a plurality of piecewise constant regional cost values independent of the sample of pixels, wherein the piecewise constant regional cost values include:
a foreground cost value associated with a foreground classification;
a background cost value associated with a background classification; and
a bias cost value associated with a bias toward the background classification or the foreground classification; and
classifying pixels in the plurality of pixels into one or more coherent regions, with each region classified as being foreground or background based on the sample of pixels and using the piecewise constant regional cost values and each coherent region includes at least some pixels in the raster of pixels not included in the sample of pixels;
wherein the pixels in the plurality of pixels are coherently classified while receiving the identification of the sample of pixels, receiving the identification of the sample of pixels includes receiving a first event corresponding to a beginning of the unbroken stroke and receiving a second event corresponding to an end of the unbroken stroke, and classifying the pixels is performed after receiving the first event but before receiving the second event.

27. A system comprising:
means for receiving user input as an unbroken stroke drawn on an image, the unbroken stroke defining a sample of pixels from an image, the image being defined by a raster of pixels;
a cost module that defines a plurality of piecewise constant regional cost values independent of the sample of pixels, wherein the piecewise constant regional cost values include:

a foreground cost value associated with a foreground classification;

a background cost value associated with a background classification; and a bias cost value associated with a bias toward the background classification or the foreground classification; and while receiving the user input as an unbroken stroke, means for performing the following actions one or more times:

classifying pixels in the raster of pixels into one or more coherent regions, with each region classified as being foreground or background based on the sample of pixels and using the plurality of piecewise constant regional cost values, wherein each coherent region includes at least some pixels in the raster of pixels not included in the sample of pixels; and updating a rendering of the image on a display to depict classified foreground pixels and background pixels as the sample is being defined;

wherein the means for receiving the user input includes means for receiving a first event corresponding to a beginning of the unbroken stroke and receiving a second event corresponding to an end of the unbroken stroke, and the actions are performed after receiving the first event but before receiving the second event.

28. A system comprising:

means for receiving an identification of a sample of pixels from an image having a plurality of pixels, wherein the identification of the sample of pixels is received as an unbroken stroke drawn on an image;

a cost module that defines a plurality of piecewise constant regional cost values independent of the sample of pixels, wherein the piecewise constant regional cost values include:

a foreground cost value associated with a foreground classification;

a background cost value associated with a background classification; and a bias cost value associated with a bias toward the background classification or the foreground classification; and means for classifying pixels in the plurality of pixels into one or more coherent regions, with each region classified as being foreground or background based on the sample of pixels and using the piecewise constant regional cost values, including incrementally solving one or more graph cut problems and classifying a coherent border area of the image at a full image resolution, the border area being determined from a classification of a lower resolution version of the image, wherein each coherent region includes at least some pixels in the raster of pixels not included in the sample of pixels;

wherein the pixels in the plurality of pixels are classified while receiving the identification of the sample of pixels, the means for receiving the identification of the sample of pixels includes means for receiving a first event corresponding to a beginning of the unbroken stroke and receiving a second event corresponding to an end of the unbroken stroke, and classifying the pixels is performed after receiving the first event but before receiving the second event.

29. A system comprising:

means for receiving an identification of a sample of pixels from an image having a plurality of pixels, wherein the identification of the sample of pixels is received as an unbroken stroke drawn on an image;

a cost module that defines a plurality of piecewise constant regional cost values independent of the sample of pixels, wherein the piecewise constant regional cost values include:

a foreground cost value associated with a foreground classification;

a background cost value associated with a background classification; and a bias cost value associated with a bias toward the background classification or the foreground classification; and means for classifying pixels in the plurality of pixels into one or more coherent regions, with each region classified as being foreground or background based on the sample of pixels and using the piecewise constant regional cost values and each coherent region includes at least some pixels in the raster of pixels not included in the sample of pixels;

wherein the pixels in the plurality of pixels are classified while receiving the identification of the sample of pixels, the means for receiving the identification of the sample of pixels includes means for receiving a first event corresponding to a beginning of the unbroken stroke and receiving a second event corresponding to an end of the unbroken stroke, and classifying the pixels is performed after receiving the first event but before receiving the second event.

\* \* \* \* \*